United States Patent
Behroozi

(10) Patent No.: US 10,420,418 B2
(45) Date of Patent: Sep. 24, 2019

(54) SYSTEM FOR MOUNTING, ACCESSING, MOVING AND FOLDING AWAY ARTICLES ON, UNDER OR ALONG A SURFACE

(71) Applicant: Beanius, L.L.C., Brooklyn, NY (US)

(72) Inventor: Ryan H. Behroozi, Brooklyn, NY (US)

(73) Assignee: Beanius, L.L.C., Brooklyn, NY (US)

( * ) Notice: Subject to any disclaimer, the term of this patent is extended or adjusted under 35 U.S.C. 154(b) by 40 days.

(21) Appl. No.: 15/122,996

(22) PCT Filed: Mar. 3, 2015

(86) PCT No.: PCT/US2015/018380
§ 371 (c)(1),
(2) Date: Sep. 1, 2016

(87) PCT Pub. No.: WO2015/134418
PCT Pub. Date: Sep. 11, 2015

(65) Prior Publication Data
US 2017/0065077 A1 Mar. 9, 2017

Related U.S. Application Data

(60) Provisional application No. 61/948,189, filed on Mar. 5, 2014.

(51) Int. Cl.
*A47B 23/04* (2006.01)
*F16M 11/10* (2006.01)
(Continued)

(52) U.S. Cl.
CPC ........... *A47B 23/043* (2013.01); *F16M 11/10* (2013.01); *F16M 11/2014* (2013.01);
(Continued)

(58) Field of Classification Search
CPC .. A47B 23/043; F16M 11/10; F16M 11/2014; F16M 11/2085; F16M 11/2092;
(Continued)

(56) References Cited

U.S. PATENT DOCUMENTS

| 1,260,089 A | 3/1918 | Stocker |
| 1,345,194 A | 6/1920 | Johnson |

(Continued)

FOREIGN PATENT DOCUMENTS

| EP | 2684489 | 1/2014 |
| GB | 2414173 | 11/2005 |

OTHER PUBLICATIONS

International Search Report from PCT/US2015/018380 dated Aug. 25, 2015.

*Primary Examiner* — Nkeisha Smith
(74) *Attorney, Agent, or Firm* — Keusey & Associates, P.C.

(57) ABSTRACT

It is the objective of the present invention to create additional functional, flexible and accessible work and storage area in the home, office, workshop, automobile, medical and industrial environments by providing means to firmly and securely mount, store and access articles such as appliances (e.g., flat panel video displays/monitors, can openers, weighing scales) and organizing/storage vessels (e.g., spice racks, first aid kits, sewing boxes, knife blocks, tool kits) on downwardly facing surfaces, such as the underside of cabinets and shelves, and on vertical surfaces (such as cabinet doors and frames) and by enhancing access to those articles on horizontal surfaces such as countertops. The invention performs its functions using a small number of readily manufacturable, modular, standardized components. The invention also performs its functions maximizing adjustability, reliability, use of available space and ease and flexibility of installation.

13 Claims, 14 Drawing Sheets

(51) Int. Cl.
  *F16M 11/20* (2006.01)
  *F16M 11/42* (2006.01)
  *F16M 13/02* (2006.01)

(52) U.S. Cl.
  CPC ..... *F16M 11/2085* (2013.01); *F16M 11/2092* (2013.01); *F16M 11/425* (2013.01); *F16M 13/022* (2013.01); *F16M 13/027* (2013.01); *F16M 2200/022* (2013.01); *F16M 2200/027* (2013.01)

(58) Field of Classification Search
  CPC .. F16M 11/425; F16M 13/022; F16M 13/027; F16M 2200/022; F16M 2200/027
  USPC ......................................................... 248/126
  See application file for complete search history.

(56) References Cited

U.S. PATENT DOCUMENTS

| | | | |
|---|---|---|---|
| 2,082,672 A | 6/1937 | Waugh | |
| 2,254,832 A | 9/1941 | Weight | |
| 2,492,697 A | 12/1949 | Higley | |
| 2,599,416 A | 6/1952 | Saecker | |
| 2,784,929 A | 3/1957 | Biening | |
| 2,839,349 A | 6/1958 | Culver | |
| 2,865,634 A | 12/1958 | Townsend | |
| 3,485,544 A | 12/1969 | Beckerman | |
| 3,889,914 A | 6/1975 | Torme | |
| 4,184,725 A | 1/1980 | Spangler | |
| 4,369,948 A | 1/1983 | Krauss et al. | |
| 4,460,145 A | 7/1984 | Ando | |
| 4,605,193 A | 8/1986 | Kuparinen | |
| 4,712,692 A | 12/1987 | Peinsipp | |
| 4,807,764 A * | 2/1989 | Bellin | A47B 77/10 211/118 |
| 5,069,350 A | 12/1991 | Wolff et al. | |
| 5,131,620 A | 7/1992 | Boundy | |
| 5,242,219 A | 9/1993 | Tomaka | |
| 5,244,272 A | 9/1993 | Thompson | |
| 5,288,049 A | 2/1994 | Hays | |
| 5,460,280 A | 10/1995 | Feddeler | |
| 5,636,816 A | 6/1997 | Burton et al. | |
| 5,676,440 A | 10/1997 | Garber et al. | |
| 6,318,567 B1 | 11/2001 | Braley | |
| 6,341,754 B1 | 1/2002 | Melito et al. | |
| 6,435,634 B1 | 8/2002 | Webb et al. | |
| 6,604,720 B1 | 8/2003 | Wilson | |
| 7,100,882 B2 | 9/2006 | Behroozi | |
| 7,416,162 B2 | 8/2008 | Behroozi | |
| 7,793,907 B2 | 9/2010 | Woodward et al. | |
| 7,837,170 B2 | 11/2010 | Behroozi | |
| 8,348,492 B2 * | 1/2013 | Mier-Langner | F21V 21/096 362/147 |
| 8,413,822 B2 | 4/2013 | Bailey | |
| 2002/0109444 A1 | 8/2002 | Webb et al. | |
| 2004/0084586 A1* | 5/2004 | Gillespie | F16M 11/08 248/278.1 |
| 2005/0051688 A1* | 3/2005 | Dittmer | F16M 11/10 248/276.1 |
| 2005/0258321 A1* | 11/2005 | Worrall | F16M 11/046 248/201 |

\* cited by examiner

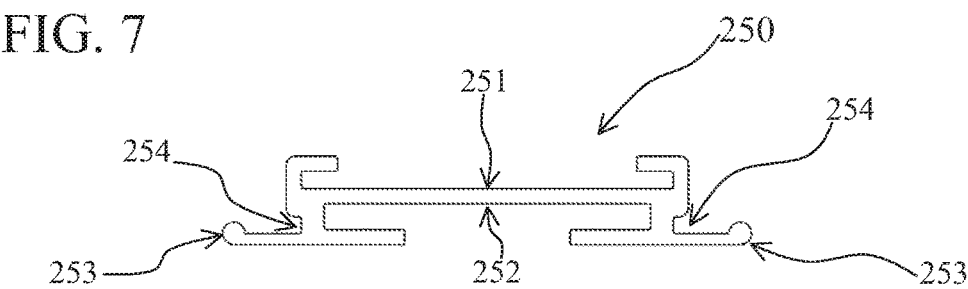
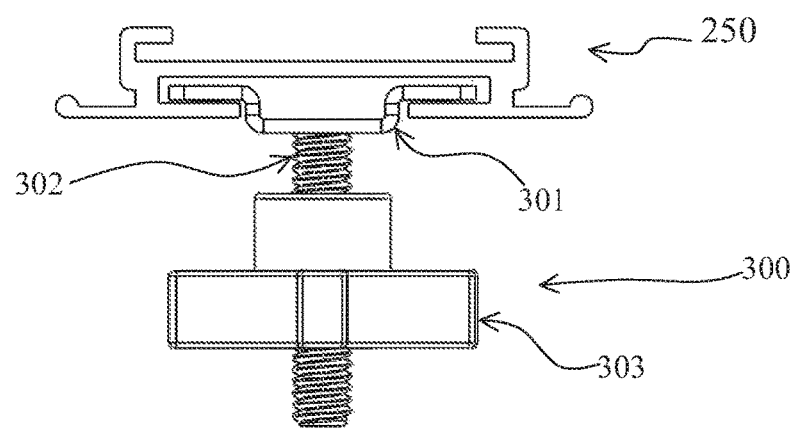
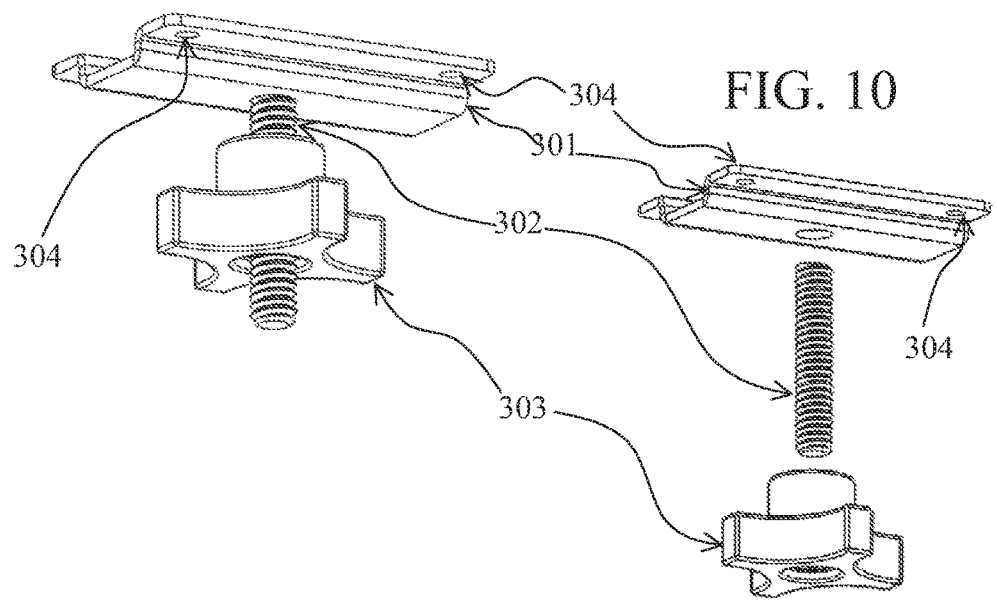

FIG. 11
FIG. 12
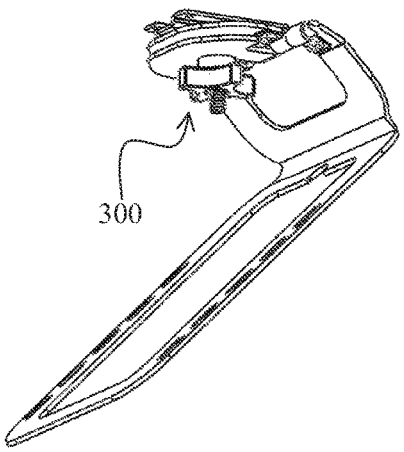
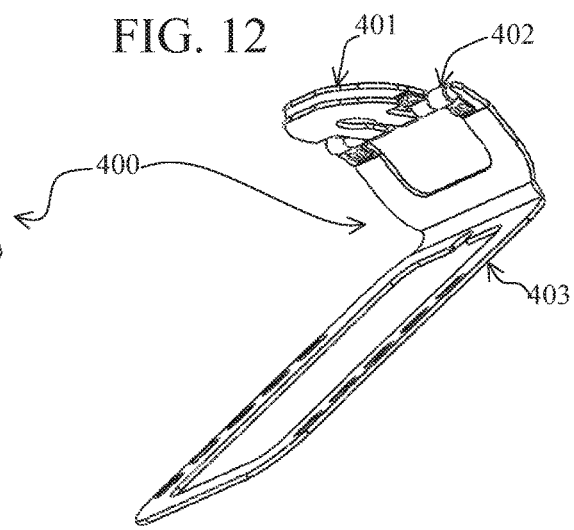
FIG. 14
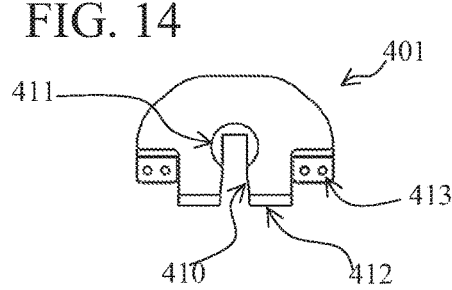
FIG. 13
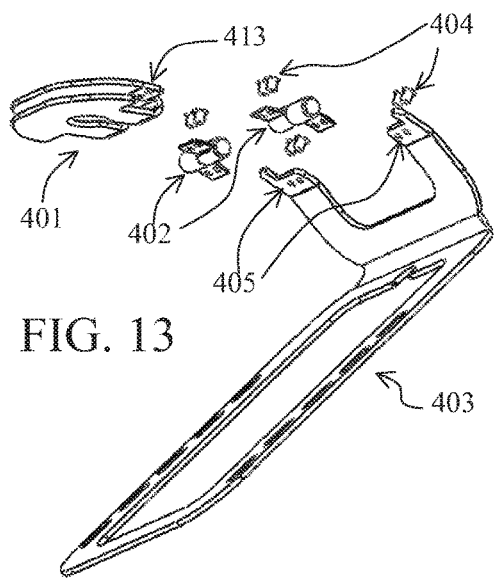
FIG. 15
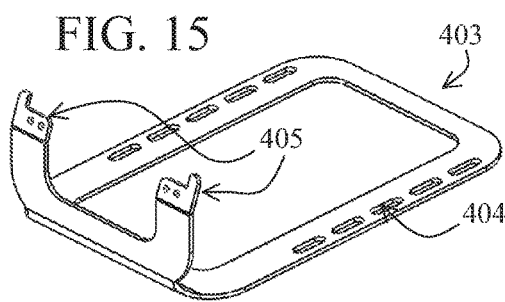

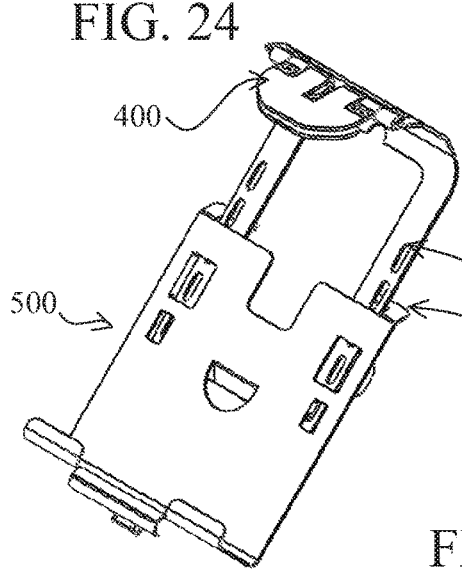
FIG. 24
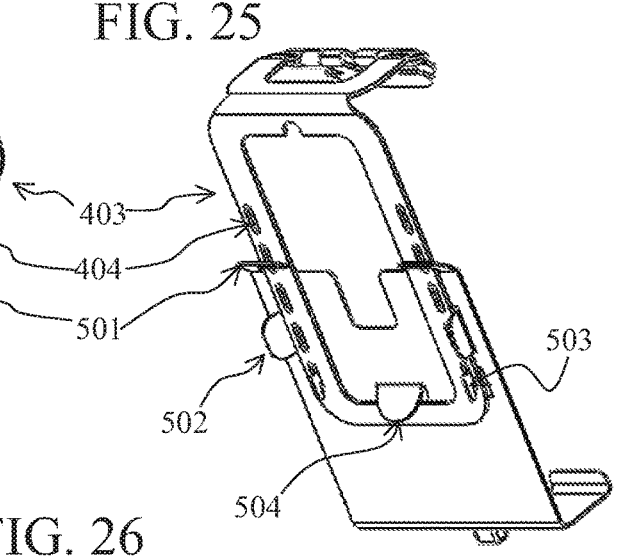
FIG. 25
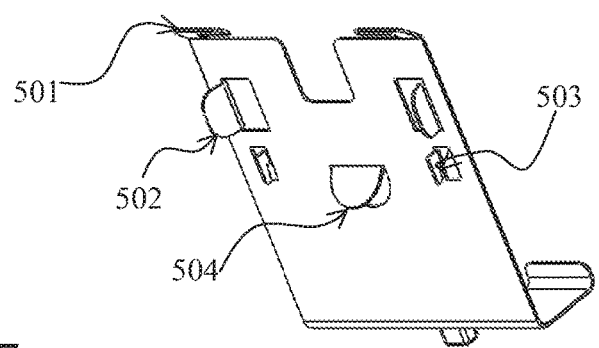
FIG. 26
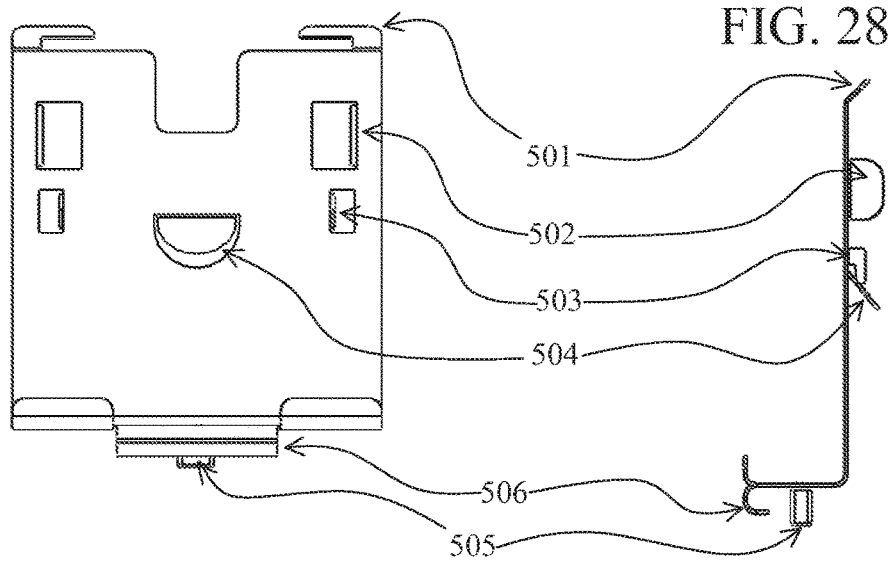
FIG. 27
FIG. 28

SYSTEM FOR MOUNTING, ACCESSING, MOVING AND FOLDING AWAY ARTICLES ON, UNDER OR ALONG A SURFACE

BACKGROUND OF THE INVENTION

1. Field of the Invention

This invention relates to articles and systems of articles, primarily appliances and storage/organizing devices, that are designed to mount under downwardly facing, vertical or horizontal surfaces such as, but not limited to, cabinets, shelves and countertops, in work areas such as those found in kitchens, workshops, offices, hospitals, utility rooms, storage rooms, laundry rooms or industrial/fabrication facilities.

1. Prior Art

Functional, flexible, accessible work and storage area is needed in virtually all home, office, shop and industrial environments. The size of this usable work and storage area can be substantially augmented by firmly and securely mounting articles such as appliances (e.g., can openers, bookholders, flat panel video displays) and organizing/storage vessels (e.g., spice racks, first aid kits, knife drawers, tool boxes) onto downwardly facing surfaces, such as underneath cabinets or shelves. Any system or arrangement addressing undersurface storage can increase its usefulness by firmly and securely mounting articles onto cabinet vertical workspace surfaces such as cabinet doors and frames and also by enhancing countertop access to those article.

Prior to A System For Mounting, Accessing, Moving and Folding Away Articles Under a Downwardly Facing Surface (U.S. Pat. No. 7,100,882—Behroozi—Sep. 5, 2006), prior art that have sought to make use of the space under downwardly facing surfaces (primarily cabinet bottoms) fell into two major categories.

The first category accounts for the majority of prior art where each invention provides functionality for a specialized purpose, such as an under-cabinet bookholder, can opener or spice rack. Those mentioned below are designed to fold up under a cabinet bottom to take up less space when not in use and pull down again when access and use is required. Specific examples of these inventions include: Document Display Shelf Apparatus (U.S. Pat. No. 6,435,634—Webb—Aug. 20, 2003), Book-holder (U.S. Pat. No. 4,460,145—Ando—Jul. 17, 1984), Disappearing Bookholder (U.S. Pat. No. 4,369,948—Krauss—Jan. 25, 1983), Book-holding Apparatus for Kitchen Type Cabinet (U.S. Pat. No. 4,184,725—Spangler—Jan. 22, 1980), Bookholder (U.S. Pat. No. 2,599,416—Saecker—Jun. 3, 1952), Bookholder for Cabinets (U.S. Pat. No. 2,254,832—Weight—Sep. 2, 1941), Accessory Drawer (U.S. Pat. No. 2,492,697—Higley—Jan. 8, 1947) Hidden Storage Shelf (U.S. Pat. No. 3,485,544—Beckerman—Dec. 23, 1969), Space-saving Undercabinet Spice Jar Drawer (U.S. Pat. No. 5,244,272—Thompson—Sep. 14, 1993), Knife Drawer Unit (U.S. Pat. No. 2,839,349—Culver—Jun. 17, 1958).

These inventions are designed to be mounted in a stationary location and remain in one place fixed under a cabinet and above a work surface. They cannot be moved easily once installed. It follows that these articles also cannot easily be removed for servicing, adjustment and/or cleaning. Virtually all require tools and some requiring partial dismantling to do so. To install them requires planning, careful measurement and the use of tools, including some specialized cutting and fitting.

The methods for mounting and removing these articles are different for each (i.e., they are nonstandard). Many have inherently weak or unstable mountings due to the small footing areas they span or due to their dependence on only a comparatively thin bottom panel of the cabinet for stability. To install or remove articles, users must expend considerable effort bending and twisting to properly orient themselves and their tools in order to see the article and installation area underneath the downwardly facing surface.

In use (when deployed/pulled-down) many of these prior art are inconveniently oriented with respect to the user and their intended use and lack the adjustability to remedy the situation. In only a few cases do the articles have some limited means to adjust their position for easier use and/or access by the user.

Items wider than these units themselves cannot be folded up into the units (e.g., a wide book in a narrow bookholder) since such wide items would interfere with the folding mechanisms and/or support framing.

None provide a means for easily (i.e., by hand, without tools) moving and remounting the article along the length of the downwardly facing surface (e.g., a cabinet bottom) and it follows that none of these articles can be moved in this way while in use.

Since each has its own means of permanent mounting, none of these specialized articles are designed to be interchangeable (i.e., swapped) with one and other. Due to their differences in design approach and a lack of common parts, very little manufacturing, development, user training and marketing efficiencies (cost savings) can be realized among these inventions.

A second, smaller group of inventions attempts address the issue of mounting articles under a downwardly facing surface with a standardized approach that can be used for a variety of articles. These inventions have many significant limitations including their instability, lack of a pull-down/fold-up capability, difficult and inflexible installation, significant limitations on lateral positioning of items and their cumbersome and inflexible means of mounting, moving, and removing articles. These systems also do not employ any common/standard means of power delivery where electric power is required for a specific article (e.g., flat panel video screen).

A System for Mounting Articles Under a Downwardly Facing Surface (U.S. Pat. No. 4,807,764—Bellin—Feb. 28, 1989) employs one or, optionally for heavier objects, two tracks that attach to a downwardly facing surface and provide evenly-spaced cutout slots which can receive standard brackets in which articles can be hung. Each track must be attached via a single line of screws/fasteners to a cabinet bottom thus the strength of the cabinet bottom and the straight-line configuration of the screws limit the strength and (torquing) stability of the system.

Since the attachment of articles to the track depends on engagement with cutout slots in the track, the track does not lend itself to being made available in a nested, telescoping format. As it cannot expand lengthwise to fit the mounting surface, the track would have to be cut to size to fit under the cabinet. As such installation requires measuring and cutting, or standard lengths of track must be made available to the user. If provided in standard lengths, it is likely these standard lengths would not fully utilize the potential mounting space under the cabinet in most cases.

Also articles can be attached to the track only at discreet intervals as dictated by the cutout slots. The width of the articles installed should also fall loosely within the same discreet intervals to ensure a proper fit within the mounting brackets. Articles also must remain in the same position when not in use and cannot be folded up out of sight and out of the way of a potential work area.

In order to change the position of an article, the article must be dismounted using screwdriver or thumbscrews/wing nuts and remounted in another set of slots. This not only requires a good deal of effort but also in many cases requires that the article be at least partially dismantled and taken out of use to be removed or moved. Height, tilt, protrusion are not adjustable by any means in this system.

An Under-the-cabinet Appliance Having a Unitary Mounting Bracket and Method for Assembling the Same (U.S. Pat. No. 5,676,440—Garber—Oct. 14, 1997) provides a standard under-cabinet bracket for mounting appliances such as can openers and coffee makers. This system requires that the appliances be manufactured to fit the specific bracket design. The bracket is installed using tools in one place under a cabinet and the system makes no provisions for lateral adjustment/moving of appliances along the bottom of the cabinet. There is also no facility for folding the appliance up out of the way when not in use, no standard means of power delivery, and no way for users to adjust the appliances height, tilt and protrusion relative to the cabinet and themselves.

Similarly, Small Appliance Modular Hanger System (U.S. Pat. No. 6,341,754 B1—Melito—Jan. 29, 2002) provides a standard under-cabinet bracket more adjustable and therefore more adaptable to mounting appliances of differing dimensions than the prior example, but the system requires tools to install and adjust an appliance. Once installed the appliance is fixed in one place under a cabinet and the system makes no provisions for lateral adjustment/moving of appliances along the bottom of the cabinet. Again, there is also no facility for folding the appliance up out of the way when not in use, no standard means of power delivery, and adjusting the appliances for height, tilt and protrusion relative to the cabinet requires tools.

A System For Mounting, Accessing, Moving and Folding Away Articles Under a Downwardly Facing Surface (U.S. Pat. No. 7,100,882—Behroozi—Sep. 5, 2006), (U.S. Pat. No. 7,416,162—Behroozi—Aug. 26, 2008) and (U.S. Pat. No. 7,837,170—Behroozi—Nov. 23, 2010) provided a convenient, standardized means to mount, move, remove, and store articles under a downwardly facing surface such that the articles can be inconspicuous or essentially hidden from view under the downwardly-facing surface, and such that pull-down access to said articles can be gained easily by a user and can be adjusted for height, tilt and depth relative to the user and adjusted laterally along the entire, continuous facing edge of the downwardly-facing surface and whereby said access and orientation adjustments and said manipulations can be executed easily by hand and without the use of tools. The system could also be very easy to install requiring little or no planning, measuring, cutting clamping or fitting.

The system did not however address storage and access on vertical surfaces and countertops. The easel could not swivel. Also its rail arrangement dictated that the undercabinet articles fall essentially within the standard width of its rails and carriage, and that any additional space provided by the cabinet depth could not be utilized outside of this footprint. The rail arrangement depicted (two facing concaved elongated members) also dictated use of a retractable footing arrangement that was not mechanically optimal with respect to manufacturing cost and reliability of engagement. There was also no specific space or method provided for integrating undercabinet lighting with the system.

Other prior art that disclose storage and/or access systems not specifically designed for use on downwardly facing surfaces, some that employ universal joints and/or triangular supports that ride along a single rail, include (U.S. Pat. No. 8,413,822—Baily—Apr. 9, 2013), (U.S. Pat. No. 7,793,907—Woodward—Sep. 14, 2010), (U.S. Pat. No. 5,069,350—Wolff—Dec. 3, 1991), (U.S. Pat. No. 4,712,692—Peinsipp—Dec. 15, 1987) and (U.S. Pat. No. 3,889,914—Torme—Jun. 17, 1975). (U.S. Pat. No. 2,784,929—Diening—Mar. 12, 1957) discloses a triangular support that rests on a table top for supporting a book. These patents may be interpreted as showing the common feature of triangular supports for payloads on rail-based storage or for tabletop support. However, none of the references taken in any combination suggest transforming a rail-based storage support so that it rests on the counter and then coupling a payload to the storage support where the tram was previously connected or vice versa.

SUMMARY OF THE INVENTION

It is the objective of the present invention to create additional functional, flexible and accessible work and storage area in the home, office, workshop, automobile, medical and industrial environments by providing means to firmly and securely mount, store and access articles such as appliances (e.g., flat panel video displays/monitors, can openers, weighing scales) and organizing/storage vessels (e.g., spice racks, first aid kits, sewing boxes, knife blocks, tool kits) on downwardly facing surfaces, such as the underside of cabinets and shelves, and on vertical surfaces (such as cabinet doors and frames) and by enhancing utility and access to those articles on horizontal surfaces such as countertops. The invention performs its functions using a small number of readily manufacturable, modular, standardized parts. The invention also performs its functions maximizing adjustability, reliability, use of available space and ease and flexibility of installation.

The present invention is a system for mounting, accessing, moving and folding away articles including, but not limited to, appliances and organizing/storage vessels on, under or along a surface. There are five key elements of the system: (1) A tram-rail arrangement, which in its preferred embodiment easily installs on and can be cut to size or expanded (in a telescoping arrangement) to the length of a downwardly facing surface (e.g., the underside of a cabinet or shelf); (2) a lock-on carriage assembly which can be sized for any depth of cabinet and which locks into and is suspended on the tram-rail arrangement and can be moved by hand to any continuous position along the length of the tram-rails (3) a movable or stationary, pivoting or non-pivoting, anchor-post that can slidably engage the lock-on carriage or can be attached directly to any surface (4) a multi-surface easel-stand that pivotally or fixedly attaches to the anchor-post or to any appropriately dimensioned stationary post or knob on any surface including a cabinet face or frame. The multi-surface easel-stand also can attach to an anchor-post (e.g., a knob) on the front of a payload arrangement to provide an adjustable footing and facilitate countertop display of and access to that payload arrangement. The multi-surface easel-stand in combination with the lock-on carriage forms a substantially clamshell-shaped configuration that can hold a wide range of substantially flat payloads of varying widths and depths. (5) A height-adjustable payload carrier that engages the multi-surface easel-stand on its slotted frame when deployed on the underside of a surface (e.g., undercabinet), or on vertical surface (e.g., cabinet door/frame). The height-adjustable payload carrier also engages the multi-surface easel-stand on its connector shoe for horizontal surface (e.g., countertop) deployment as described above.

These and other related objects are achieved according to an embodiment of the invention by a support apparatus having a L-shaped frame, a payload carrier and a connector. The L-shaped frame has a short side and a long side. The payload carrier includes slots and a knob. The connector is pivotally coupled to the short side and connected to (i) an under-cabinet tram-rail unit with the payload carrier slots sliding onto the long side to support a payload, or (ii) the knob with the payload carrier supporting a payload with the long side resting on a horizontal surface. There is further provided a longitudinally extending tram-rail unit having a pair of parallel, spaced c-shaped channels extending along the length thereof, with both c-shaped channels extending down from one side of the tram-rail unit. There is also provided a carriage having a carriage base cut from an extrusion having an upwardly extending c-channel of indefinite length. The carriage base receives within its c-channel a movable footing or a fixed footing. The movable footing arrangement has a fixed back footing edge adapted to engage a back c-shaped channel on a tram rail unit, a stop plate and a front footing plate slidably disposed within the c-channel adapted to selectively clamp a front c-shaped channel on the tram rail unit against the stop plate to allow the carriage to slide along the tram rail unit. The fixed footing arrangement has a fixed back footing edge adapted to engage the back c-shaped channel on a tram rail unit, a flexible wing tab and a front footing edge adapted to engage the front c-shaped channel on the tram rail unit against the biasing force of the flexible wing tab to attach the carriage at a fixed location on the tram rail unit. An anchor post is mounted on the carriage for engaging the slot of the connector A further embodiment of the invention provides a support apparatus having a tram-rail and a carriage. The tram-rail is a longitudinally extending unit having a pair of parallel, spaced c-shaped channels extending along the length thereof. Both c-shaped channels extend down from one side of the tram-rail unit and face in the same direction. The carriage has two footings that are spaced and configured to engage the pair of c-shaped channels to support the carriage at a selected location along the length of the tram-rail unit. The carriage includes a carriage base with an upwardly extending c-channel that can receive (i) a movable footings arrangement that can slide along the c-shaped channels in the longitudinal direction or (ii) a fixed footings arrangement that can attach to the c-shaped channels at a fixed location.

Another embodiment of the invention provides a support apparatus having a carriage and a footing arrangement. The carriage has a carriage base cut from an extrusion having an upwardly extending c-channel of indefinite length for receiving within its c-channel a movable or fixed footing arrangement. The movable footing arrangement has a fixed back footing edge adapted to engage a back c-shaped channel on a tram rail unit, a stop plate and a front footing plate slidably disposed within the c-channel adapted to selectively clamp a front c-shaped channel on the tram rail unit against said stop plate to attach the carriage at a fixed location on the tram rail unit. The fixed footing arrangement has a fixed back footing edge adapted to engage the back c-shaped channel on a tram rail unit, a movable locking tab and a front footing edge adapted to engage the front c-shaped channel on the tram rail unit and held in place by said locking tab to attach the carriage at a fixed location on the tram rail unit. There is further provided a longitudinally extending tram-rail unit having a pair of parallel, spaced c-shaped channels extending along the length thereof, wherein both c-shaped channels extend down from one side of the tram-rail unit.

The following features may be added to each of the embodiments described above. The c-shaped channels of the tram rail unit face in the same direction and are spaced at a distance to insure torquing stability, with the tram rail unit adapted to be mounted to a cabinet bottom. The carriage base is a substantially flat elongated member having a top channel to receive tram rail engaging arrangements and a bottom channel to receive payload supports. The movable footing arrangement includes one footing plate supporting the back footing edge fixed within the top channel, and a second footing plate slidably disposed within the top channel. The back footing is height adjustable to tilt the carriage to accommodate cabinet depth.

A resilient member is dimensioned and positioned to maintain the fixed footing arrangement from moving horizontally along, or disengaging from, the c-shaped channels of the tram rail unit. The resilient member is a bendable member, a rotational member, or a sliding member. There is also provided a connector including a flat plate, a threaded bore adapted to slide along a track and a bolt correspondingly sized to engage the bore to frictionally engage the track to lock the flat plate in position.

The apparatus additionally includes a substantially L-shaped frame having a short side and a long side being wide enough to insure payload stability. In an undercabinet mode there is provided means to engage a lock-on carriage on to the short end thereof. In a countertop mode there is provided means to engage a payload carrier on to the short end thereof. In a vertical surface deployment mode there is provided means to engage a vertical surface at the short end thereof, and means to slidingly engage and disengage a payload on substantially the entire length of the long side of the L-shaped frame.

There is further provided a lock channel assembly adapted to secure a functional component to a long side of an L-shaped member, with the lock channel assembly configured to receive a frame member therein and to removably lock thereto. The lock channel assembly includes tabs that engage recesses on the frame to secure the lock channel assembly in a particular location as the frame slides therealong.

The lock-on carriage, without the easel, can also be used to mount articles on the tram-rails that are not flat and/or do not require the easel's pull-down functionality, such as toaster ovens and can openers. The system's design allows, with little effort, articles such as appliances and storage devices to be mounted, moved forward and backward or side-to-side, accessed and folded up and out of the way.

The system allows articles to be mounted in such a way that they can be pulled down and adjusted (for height, tilt, swivel, forward protrusion) into a position for convenient (ergonomic), stable access and use. Furthermore, the system allows the articles to be easily folded away, substantially out of sight, and out of potential work areas when not being used or accessed. The system allows articles to be folded away in such way that they do not interfere (while being folded) with work areas underneath them that may be in use.

Because of the clamshell-shaped configuration of the easel and carriage combination, items folded up on the easel-stand can be much wider than the actual easel-carriage combination itself and will not interfere with the folding mechanism. The system also allows articles to be easily (i.e., by hand and without the use of tools) mounted anywhere (i.e., continuously) along the length of the downwardly facing surface, swapped interchangeably, moved while in use (e.g., moving a book holder while there is a book on it) and removed for cleaning, adjustment and servicing.

The system is easy to install and requires a minimum of tools and planning and, when using telescoping rails, no measurements. In one embodiment the tram-rails can be nested and configured to expand to fit the cabinet bottom and are light enough to be stuck onto a cabinet bottom with double sided adhesive tape prior to securing them to the cabinet bottom with as few as six screws. In one embodiment of the system, the system also provides a reliable, universal means of power delivery to articles that require it.

Manufacturing, development and marketing efficiencies (cost savings) can also be realized because the system and articles used by the system are designed to be interchangeable between articles and share many common parts. Users will find that mounting, detaching, folding-away and accessing different articles will use essentially the same methodology for all applications. Further objects and advantages of the invention will become apparent from a consideration the drawings that follow and ensuing description.

BRIEF DESCRIPTION OF THE DRAWINGS

FIG. 7 is a front profile view of the carriage base extrusion.

FIG. 8 is a front profile view of the anchor post slidingly engaged in the carriage base extrusion.

FIG. 9 is a schematic perspective view of the anchor post.

FIG. 10 is an exploded schematic perspective view of the anchor post.

FIG. 11 is a schematic perspective of the multi-surface easel stand engaged with the anchor post.

FIG. 12 is a schematic perspective of the multi-surface easel stand by itself with its major components labeled.

FIG. 13 is an exploded schematic perspective of the multi-surface easel stand.

FIG. 14 is a bottom view of the connector shoe.

FIG. 15 is an isometric perspective view of the L-shaped frame.

FIG. 24 is a schematic perspective view of the multi-surface easel-stand with the payload carrier slidingly engaged on the long side of the easel-stand L-frame.

FIG. 25 is a reversed-side schematic perspective view of the multi-surface easel-stand with the payload carrier slidingly engaged on the long side of the easel-stand L-frame.

FIG. 26 is a reversed-side schematic perspective view of the payload carrier alone.

FIG. 27 is a front view of the payload carrier.

FIG. 28 is a side view of the payload carrier.

DETAILED DESCRIPTION OF THE PREFERRED EMBODIMENT

Figure 1:
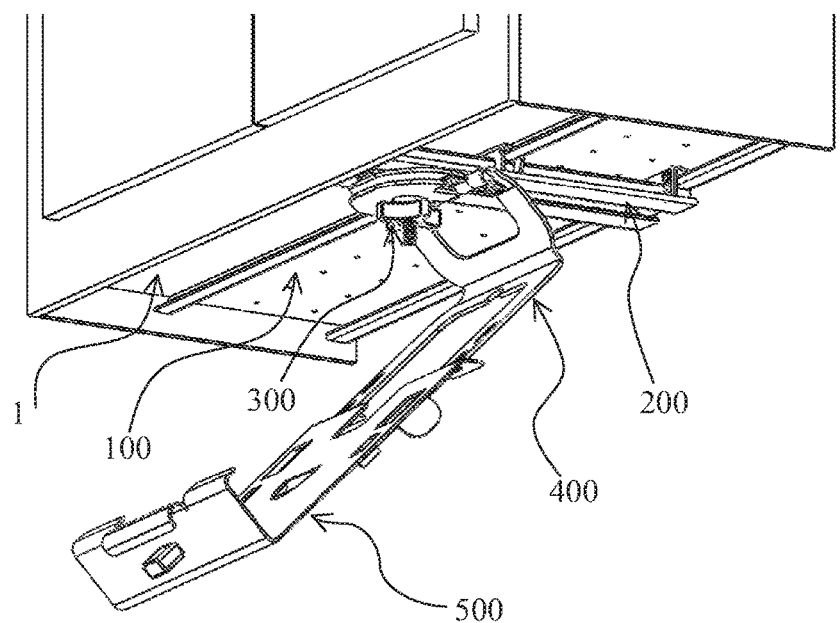
FIG. 1 is a schematic perspective view of the underside of a partial high cabinet with all of the major elements of the preferred embodiment of the system with the payload carrier in its forward, 45 degree, pulled down deployment.
Figure 2:
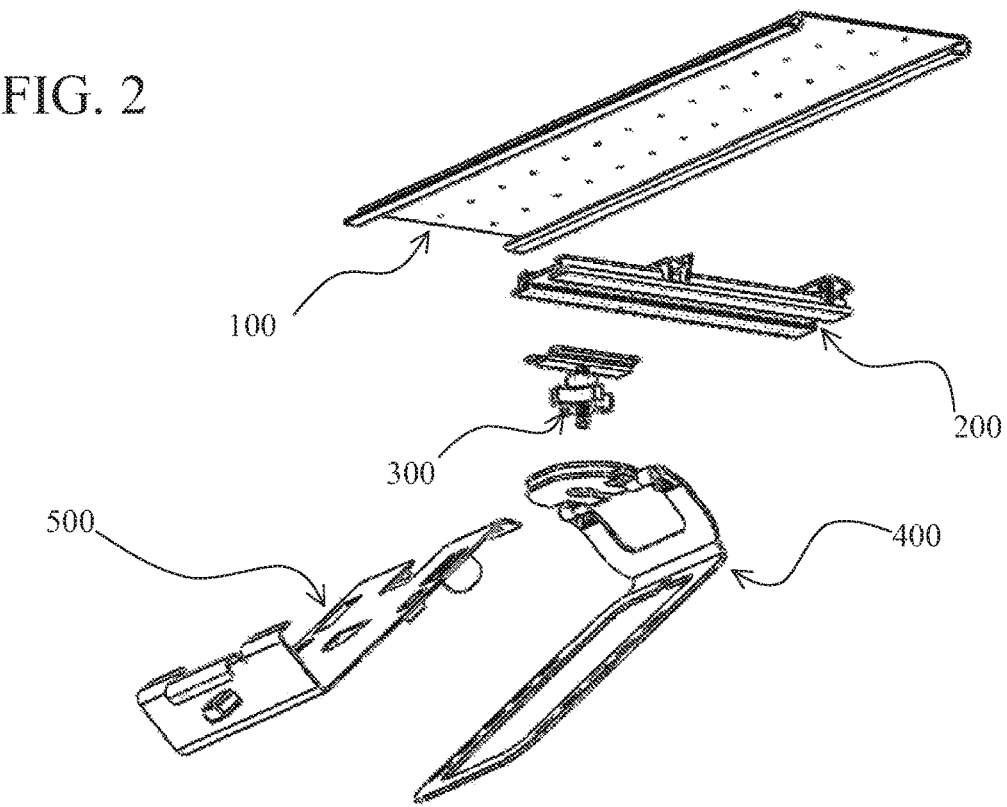
FIG. 2 is an exploded view of the system in FIG. 1 without the cabinet.

FIG. 1 is an overview drawing of the preferred embodiment showing the five key component elements of the system (100, 200, 300, 400, 500) in one of the many possible deployment configurations of the system. FIG. 2 shows an exploded view of those same five key components elements of the system. In the deployment configuration of FIG. 1 the payload carrier 500 (in this case a book easel) is positioned forward and diagonally protruding from underneath a high kitchen cabinet bottom 1. The tram-rail unit 100 is fixed to the downwardly facing surface of the cabinet 1 by attachment means that can include screws, other fasteners and/or adhesives. The lock-on carriage assembly 200 is slidably engaged onto and suspended from the tram-rail unit 100 allowing the lock-on carriage 200 to be moved anywhere along the length of the tram-rail 100 without disengaging the lock-on carriage 200. The moveable anchor-post 300 slides front-to-back in the lock-on carriage assembly 200. The multi-surface easel-stand 400 attaches pivotally to the moveable anchor-post 300 allowing full rotation of the multi-surface easel-stand 400. The multi-surface easel-stand 400 is shown in its open position. The payload carrier 500 slidably engages the multi-surface easel-stand 400 and is adjustable to several height intervals on the multi-surface easel-stand 400.

FIGS. 3-15 and FIGS. 24-28 depict the preferred embodiments of the components in greater detail. FIGS. 16-23 and FIGS. 29, 30 show the preferred embodiment of the system in other deployment configurations. FIGS. 31-44 depict other embodiments of the system and its components.

Figure 3:
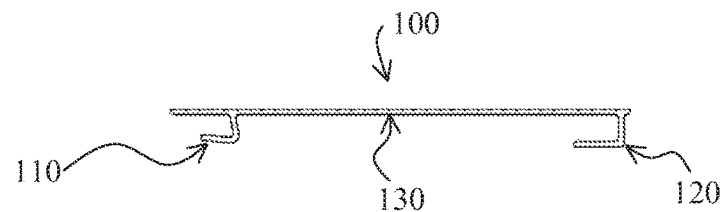
FIG. 3 is a side view of the tram-rail arrangement.

FIGS. 3-6 show details of the tram rail unit 100 and lock-on carriage unit 200 and how they are engaged. FIG. 3 shows a side profile view of the tram rail unit 100. Its main features include two c-channels, front 110 and back 120 that face forward at substantially the same horizontal level and are spaced at a distance to ensure torquing stability to any payload engaged in the tram rail c-channels 110 and 120. The c-channels are connected by a horizontal plate 130 that ensures stable and consistent spacing and provide points of contact/connection for the tram rail unit 100 to be attached to the high cabinet bottom 1. The tram rail unit 100 is designed to be cut to size to fit and attach under any downwardly facing surface, and to be stably and reliably engaged by plurality of carriage arrangements. The preferred embodiment of the carriage arrangement shows a lock-on carriage 200 with a movable front footing 230. A variety of fixed footing arrangements will be shown subsequently as other embodiments. The tram rail arrangement 100 can be manufactured as extruded, stamped or formed in plastic or metal. The tram rail arrangement 100 can also be realized as nested rails that expand to fit a plurality of cabinet widths.

Figure 4:
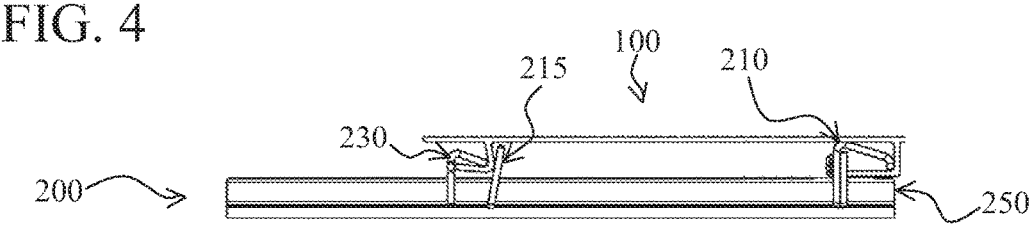
FIG. 4 is a side view of a movable footing lock-on carriage (preferred embodiment) engaged with the tram-rail arrangement.
Figure 5:
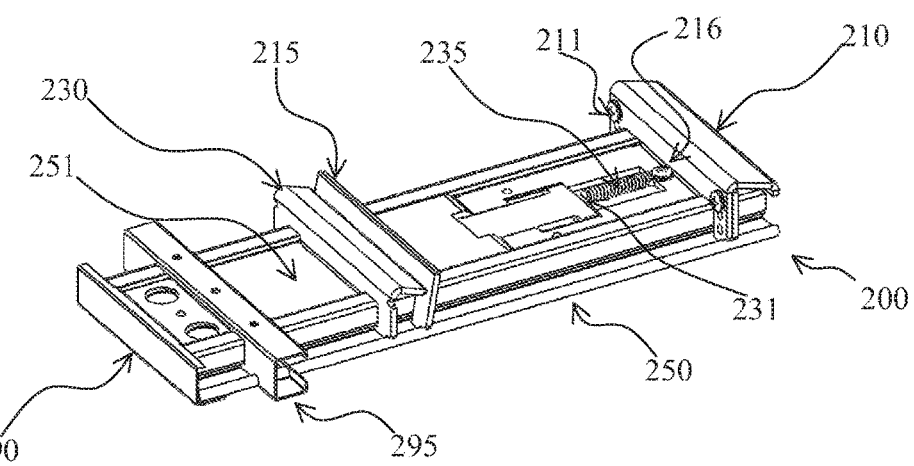
FIG. 5 is an isometric perspective view of a movable footing lock-on carriage.
Figure 6:
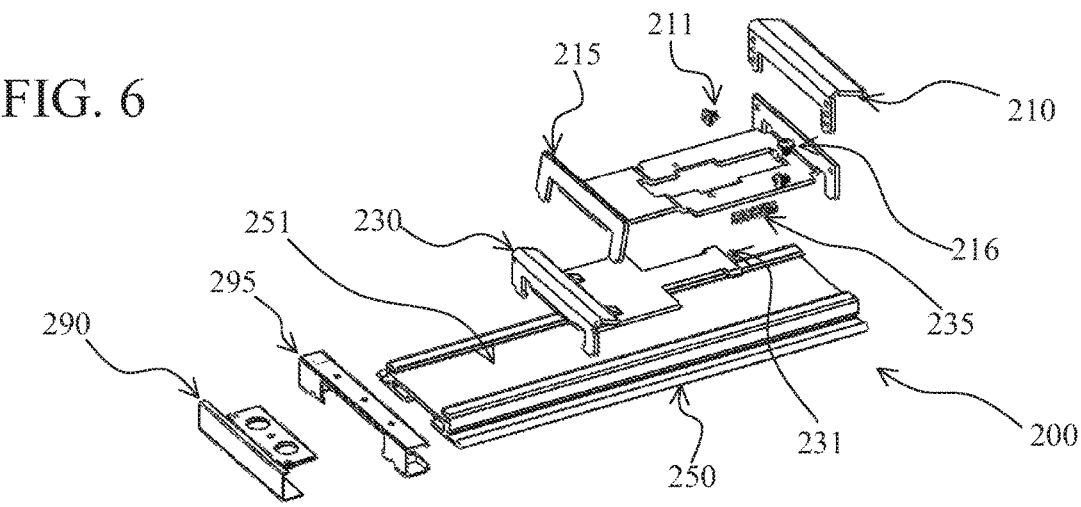
FIG. 6 is an exploded view of the lock-on carriage in FIG. 5.
Figure 16:
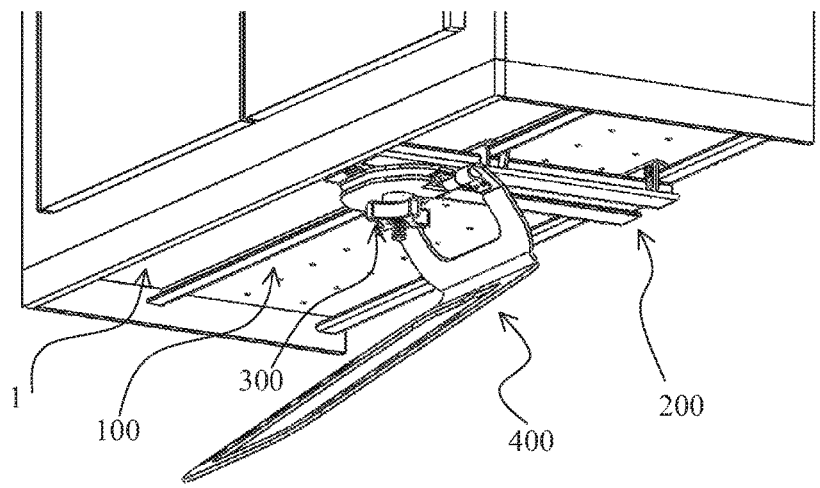
FIG. 16 is a schematic perspective view of the system (with no payload carrier) with the multi-surface easel-stand shown undercabinet in a forward positioned, 45 degree tilting deployment.
Figure 17:
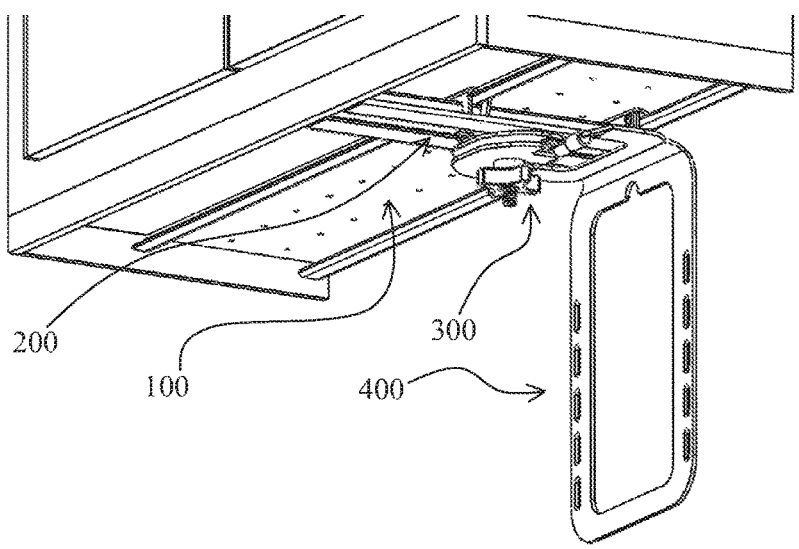
FIG. 17 is a schematic perspective view of the system (with no payload carrier) with the multi-surface easel-stand shown undercabinet in a rearward positioned, cabinet-bottom-perpendicular (i.e., backsplash) deployment.
Figure 18:
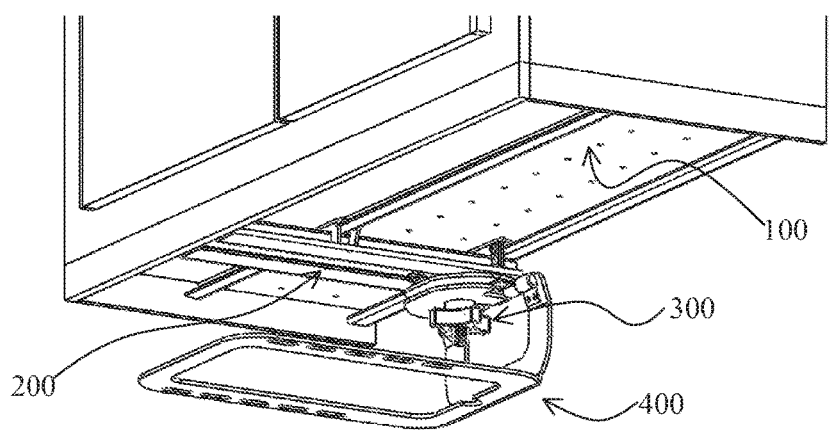
FIG. 18 is a schematic perspective view of the system (with no payload carrier) with the multi-surface easel-stand shown undercabinet in a rearward positioned, cabinet-bottom-parallel (i.e., folded up) deployment. Note that the lock-on carriage has been moved to the left.
Figure 19:
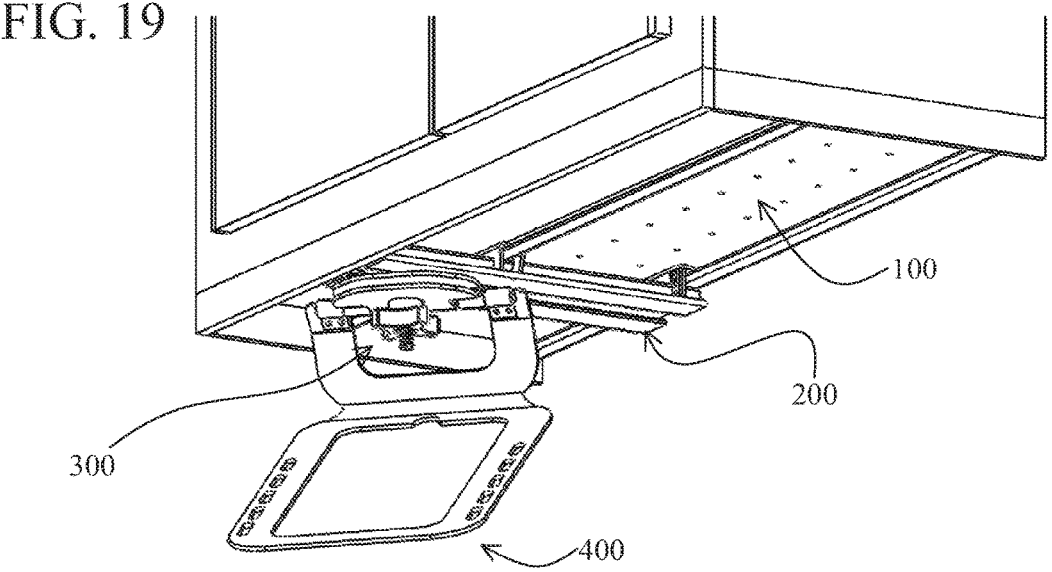
FIG. 19 is a schematic perspective view of the system (with no payload carrier) with the multi-surface easel-stand shown undercabinet in a forward positioned, 45 degree tilting, swiveled-right deployment.
Figure 20:
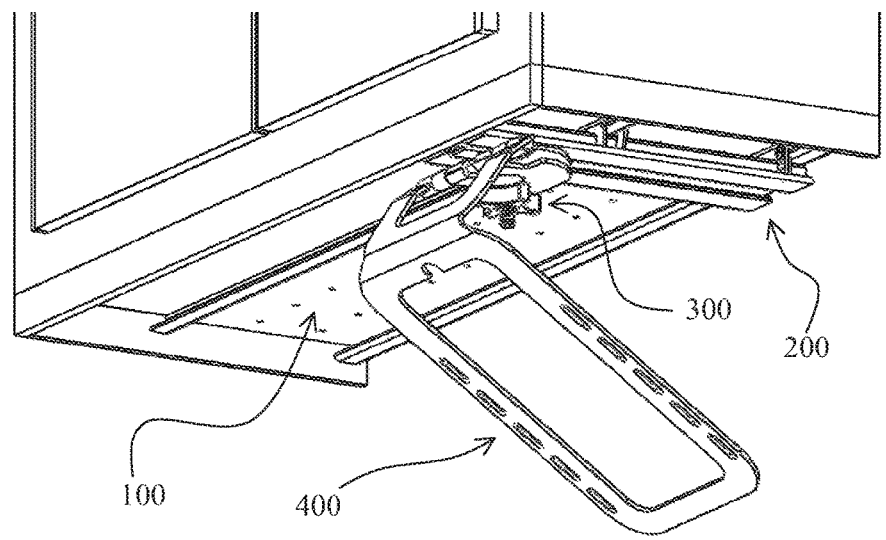
FIG. 20 is a schematic perspective view of the system (with no payload carrier) with the multi-surface easel-stand shown undercabinet in a forward positioned, 45 degree tilting, reverse-swiveled (180 degree) deployment.

FIG. 4 shows the lock-on carriage 200 engaged with the tram rail 100. This lock-on carriage 200 is built on and around the carriage base extrusion 250. This carriage base extrusion 250 is a substantially flat extruded member with a substantially flat, wide upward c-channel 251 (see FIG. 7) that enables sliding engagement of plate(s) associated with movable footing carriages 200 (FIGS. 5 & 6) and fixed footing carriage arrangements (see other embodiments FIGS. 31-33). The carriage base extrusion 250 (see FIG. 7) also has a substantially flat, wide downward c-channel 252 and has two flanges on either side 253 to enable gripping and manipulation of the carriage 200 with two hands by the user. The carriage 200 also has two small c-channels on its sides 254 to further enable sliding engagement of footing plates. (The small c-channels also facilitate the mounting of ancillary items, e.g., housing for a magnetic catch 295 and carriage end cap 290.) The downward c-channel 252 is designed to accept a variety of sliding, rotating and/or fixed payload attachment arrangements. The carriage base extrusion 250 can be extruded in metal or (clear or opaque) plastic. Clear plastic would be preferable in situations where the carriage 200 overlaps undercabinet lighting. Clear plastic would allow the light to shine through. The carriage base extrusion 250 can be cut to size to fit different cabinet depths.

The user engages the carriage base extrusion 250 is with the tram rail unit 100 using a movable footing arrangement (FIGS. 4-6) that includes a fixed back footing plate 210 with a footing edge dimensioned to engage the back c-channel of the tram rail unit 120, and a movable front footing plate 230 with a footing edge dimensioned to engage the front c-channel 110. The back (fixed) footing plate 210 is fixed by screws 211 onto a stop plate 215 that also engages in the upward c-channel 251 of the carriage base extrusion 250 and is fixed in place relative to the carriage base extrusion 250 by an anchoring screw 216. The back fixed footing plate 210 is height-adjustable with respect to the stop plate 215 allowing the carriage assembly 200 to be tilted upward so its front can meet the cabinet bottom if desired. The front (movable) footing plate 230 with a footing edge dimensioned to engage the front c-channel 110 of the tram rail 100 is slidingly engaged in the same in the upward c-channel 251 of the extruded carriage base 250.

The front (movable) footing plate 230 is held in the locked position by an extension spring 235 tensioned between the flange tab 231 and the anchoring screw 216 on the stop plate 215. To engage the carriage 200 with the tram rail 100, the user will set the back footing plate 210 of the carriage 200 into the back c-channel 120 of the tram rail unit 100. Then the user will pull forward the movable, slidingly engaged front footing plate 230 of the carriage 200 while aligning the front footing plate 230 to engage the front c-channel 110. Once aligned the user can release the front footing plate 230 allowing it to "snap backward" to engage the front c-channel 110 of the tram rail 100. The front face of the stop plate 215 keeps both front and back footings from disengaging the tram rail 100 during and after mounting.

FIGS. 7-10 show how the anchor-post 300 slidingly engages the lock-on carriage 200. The anchor-post 300 is made up of substantially flat base plate 301 dimensioned to fit slidingly in the downward c-channel 252 of the carriage base extrusion 250 (FIGS. 7 & 8), and a threaded post 302 attached (i.e. welded) so that it is set perpendicular the flat plate 301. There is also a threaded clamping knob 303 screwed onto the threaded post 302 that can hold a payload article in place on the post and keep it from rotating on the post 302. The anchor-post 300 in this case acts as a sliding pivot post within the carriage base extrusion 250 onto which the multi-surface easel-stand 400 or any other appropriately dimensioned and fitted payload article can be mounted using the clamping knob 303. In addition to mounting the payload, the clamping knob 303, when tightened, compresses the carriage base channel 250 between itself and the base plate 301 and as a result inhibits swiveling or pivoting of the payload and also inhibits the movable anchor-post 300 from sliding forward or backward in the carriage base extrusion 250. Note that the anchor-post 300 can be attached directly to a cabinet bottom or other surface by using fasteners through mounting holes 304.

FIGS. 11-15 show how the multi-surface easel-stand 400 engages the moveable anchor-post 300. The multi-surface easel-stand 400 is a substantially wide, L-shaped frame 403 with a slotted connector shoe 401 affixed at the short side of L-shaped frame using friction hinges 402 secured in place at mounting holes 413 and 405 using rivets 404. In this context, the multi-surface easel-stand 400 can pivotally engage at its shoe connector slot 410 and be tightened onto the moveable anchor-post 300 using the anchor-post clamping knob 303. The round base of the clamping knob 303 when tightened will engage the round cutout 411 on the slotted connector shoe 401 and prevent it from disengaging from the moveable anchor-post 300. The friction hinges 402 allow the multi-surface easel-stand 400 to adjust and deploy at variety of angles. In this context the multi-surface easel-stand 400 mounted on the moveable anchor-post 300 acts as an adjustable (tilt and swivel) undercabinet deployed easel.

Other possible deployment configurations for undercabinet use of the multi-surface easel-stand 400 are shown in FIGS. 16-20. The carriage 200 on tram rails 100 enables lateral (side to side) positioning of a payload. The moveable anchor-post 300 sliding within the lock-on carriage 200 enables front-to-back positioning of a payload. The multi-surface easel stand 400 with the moveable anchor-post 300 enable full rotational positioning of a payload. The multi-surface easel stand 400 (from its hinges 402) enables tilting of a payload.

Figure 21:
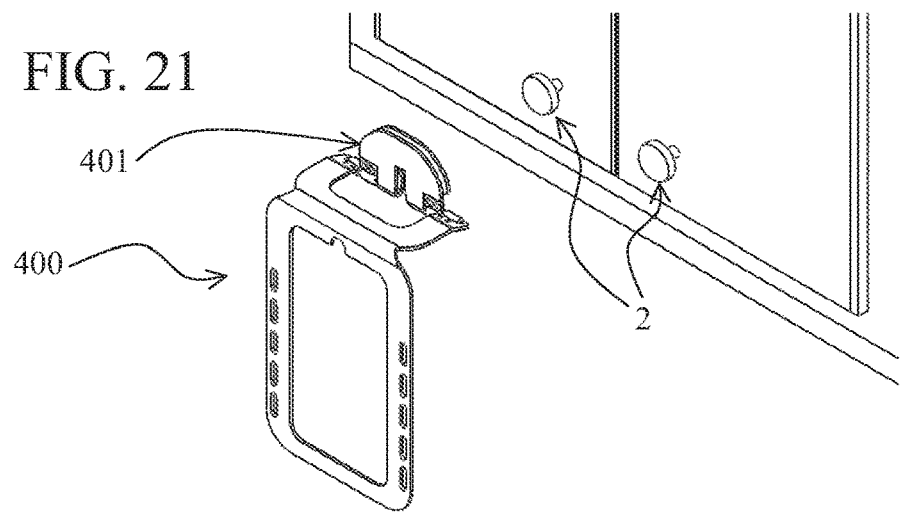
FIG. 21 is a schematic perspective view of the multi-surface easel-stand (with no payload carrier) and cabinet knobs prior to engagement.
Figure 22:
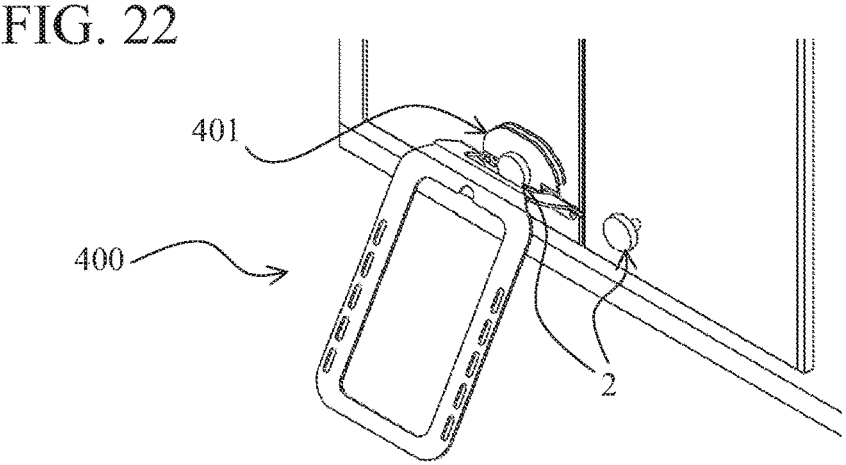
FIG. 22 is a schematic perspective view of the multi-surface easel-stand (with no payload carrier) and cabinet knobs engaged (i.e., cabinet-front deployment).
Figure 23:
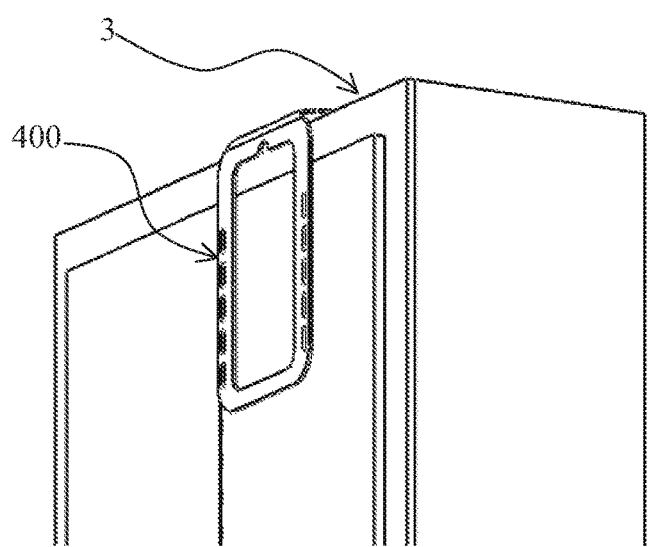
FIG. 23 is a schematic perspective view of the multi-surface easel-stand (with no payload carrier) hanging over top of the cabinet frame.

FIGS. 21 and 22 show the multi-surface easel-stand 400 deployed on a vertical cabinet face by fitting the slotted connector shoe 401 on a cabinet knob 2. In this case the cabinet knob 2 acts similarly to the anchor-post 300 but in the context of a vertical cabinet door. Note that fitted anchor posts or knob adaptors that perform the function of the knobs 2 depicted can be supplied as part of the system. FIG. 23 shows the multi-surface easel-stand 400 deployed on a vertical cabinet face by hooking it over the top of a cabinet door or frame 3.

FIGS. 24 & 25 shows a payload carrier 500 (in this case a book easel) mounted on the multi-surface easel-stand 400. The payload carrier 500 is held at its top onto either face (front or back) of the L-frame 403 with the easel guide hooks 501. The payload carrier 500 is free to slide up and down the length of the L-frame 403. The guide tabs 502 keep the easel 500 aligned with the L-frame 403 as shown. To set the height of the easel 500 relative to the L-frame 403 the user will tilt the easel 500 away from or toward the bottom of the L-frame 403 in order to disengage or engage (respectively) the stop hook tabs 503 with the frame stop slots 404. The terminal stop 504 provides an additional barrier to keep the easel 500 from accidentally coming off of the end of the easel-stand L-frame 403.

Figure 29:
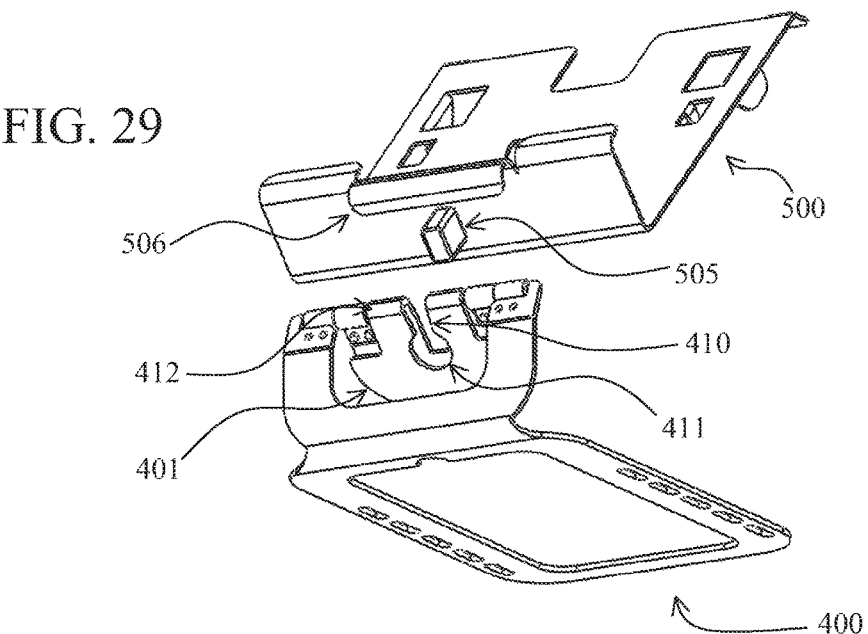
FIG. 29 is a schematic perspective view of the multi-surface easel-stand and the payload carrier prior to engagement of the carrier front to the easel-stand connector shoe.
Figure 30:
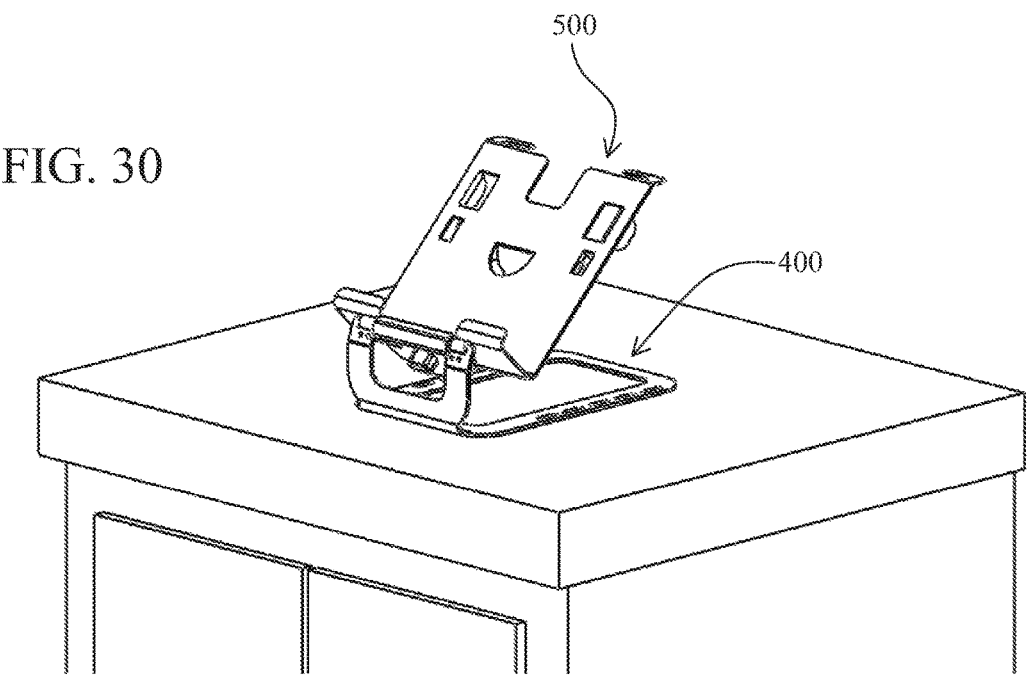
FIG. 30 is a schematic perspective view of the multi-surface easel-stand with the payload carrier engaged (carrier front to the easel-stand connector shoe) in tabletop deployment.

FIGS. 29 and 30 show how the payload carrier 500 and the multi-surface easel-stand 400 engage for countertop deployment. The user will slide the front of the easel 500 onto the multi-surface easel-stand 400 so that the turn-knob 505 moves through the shoe connector slot 410 and the slot connector rolled edge 412 is seated inside the easel lip 506. The turn-knob 505 can then be turned within the slot connector cutout 411 to lock the two units together.

Other Embodiments

Figure 31:
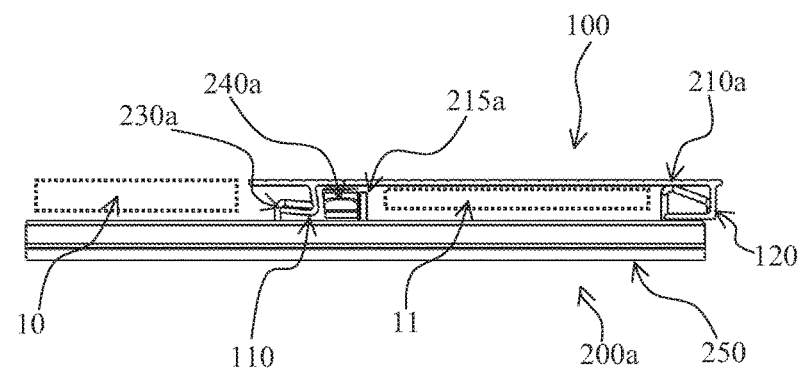
FIG. 31 is a side view of the fixed footing lock-on carriage (alternative embodiment) engaged with the tram-rail arrangement.
Figure 32:
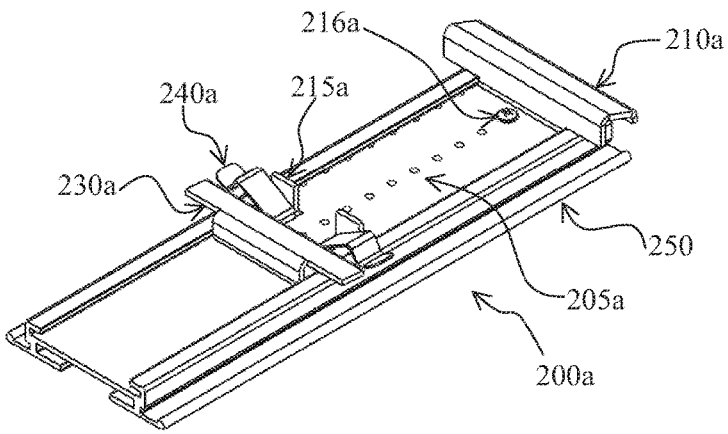
FIG. 32 is a schematic perspective view of the fixed footing lock-on carriage engaged with the tram-rail arrangement.
Figure 33:
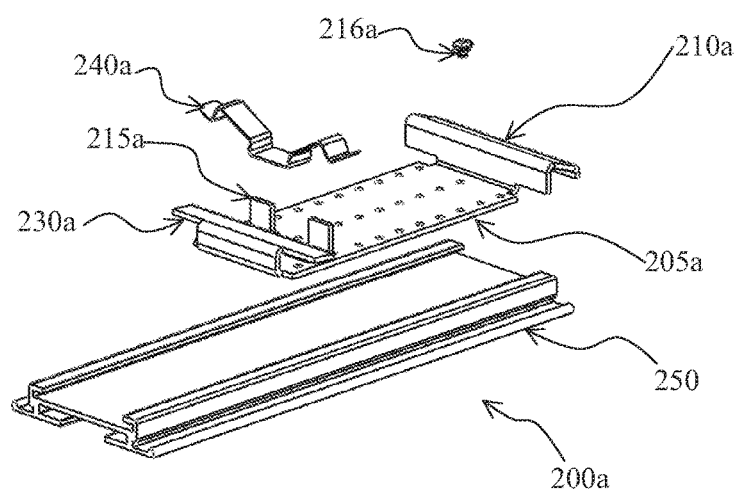
FIG. 33 is an exploded schematic perspective view of the fixed footing lock-on carriage in FIG. 32.
Figure 34:
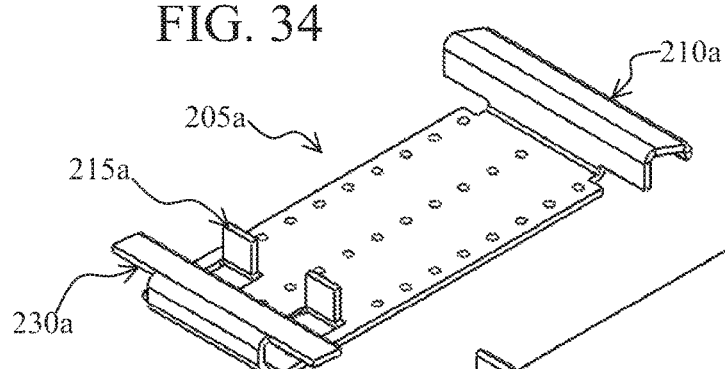
FIG. 34 is an isometric perspective view of a fixed footing plate.
Figure 35:
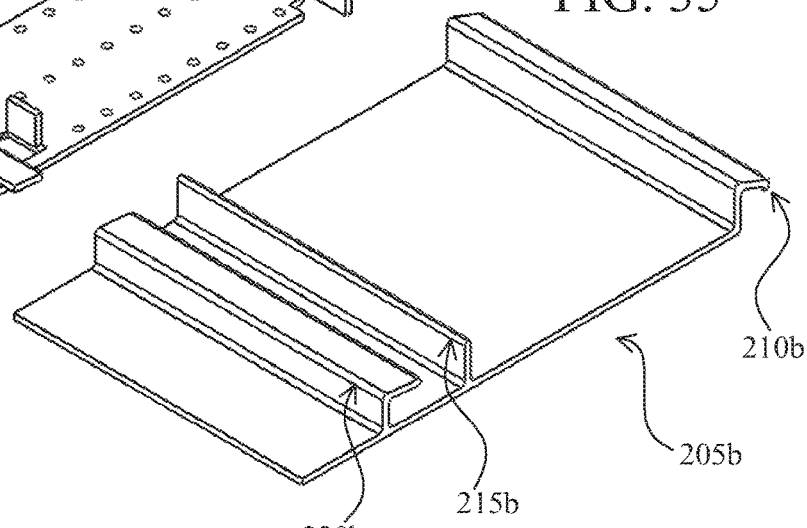
FIG. 35 is an isometric perspective view of an extruded fixed footing plate.
Figure 36:
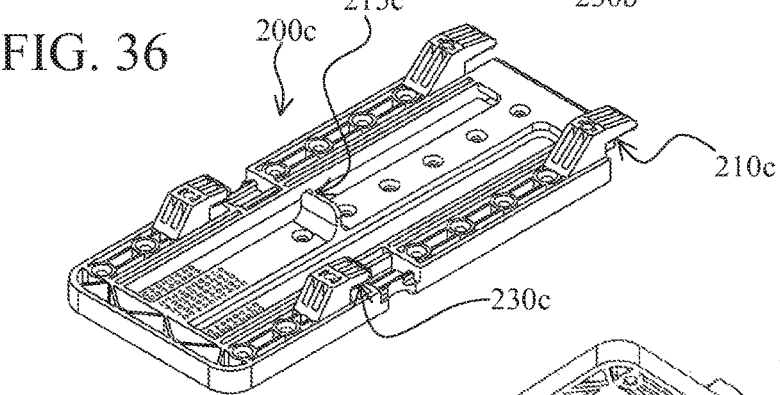
FIG. 36 is an isometric perspective view of an injection molded fixed footing carriage.
Figure 37:
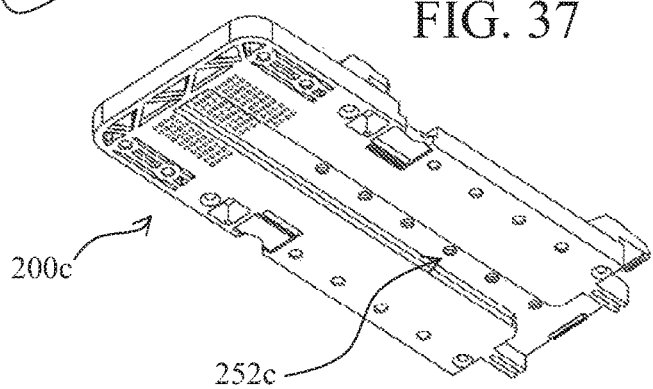
FIG. 37 is an isometric perspective view of the underside of the injection molded fixed footing carriage.

FIGS. 31-33 show a fixed footing lock-on carriage unit 200a and how it engages the standard tram rail unit 100. FIG. 31 shows a side view of the fixed footing lock-on carriage 200a engaged with the tram rail 100. Like the moveable footing carriage 200 this fixed footing carriage 200a is built on and around the carriage base extrusion 250. As before, this carriage base extrusion 250 is a substantially flat extruded member with a substantially flat, wide upward c-channel 251 (see FIG. 7) that enables sliding and fixed engagement of plate(s) associated with movable footing carriages 200 (FIGS. 4-6) and fixed footing carriage 200a arrangements (FIGS. 31-33).

Fixed-footing lock-on carriage: In this case the carriage base extrusion 250 is engaged with the tram rail unit 100 using a fixed footing plate 205a that includes three elements. 1) a fixed back footing 210a with a footing edge dimensioned to engage the back c-channel of the tram rail unit 120, 2) a front footing 230a with a footing edge dimensioned to engage the front c-channel 110 and 3) stop tabs 215a that limit backward movement of the depressible wing tabs 240a. The flexible wing tabs 240a that in their unflexed position contact the back of the front c-channel 110 of the tram rail arrangement 100 and prevent forward and backward movement relative to the front c-channel 110 and therefore keep the carriage 200a from disengaging. To disengage the fixed footing carriage 200a from the tram rails 100 the user depresses the wing tabs 240a and pulls the carriage 200a forward. The fixed footing plate 205a can also be realized as an extrusion 205b as in FIG. 35 or as essentially a one-piece carriage 200c (injection molded) with integrated downward c-channel 252c and fixed front 230c and back 210c footings as in FIGS. 36 & 37.

FIG. 31 also shows how an LED, other type of lighting application, power strip and/or other type of wiring racetrack could fit easily within the continuously unobstructed spaces (10 and 11) between the undercabinet tram rail arrangement 100 and fixed footing lock-on carriage 200a. Similar unobstructed spaces exist between the undercabinet tram rail arrangement 100 and movable footing lock-on carriage 200 in FIG. 4.

Figure 38:
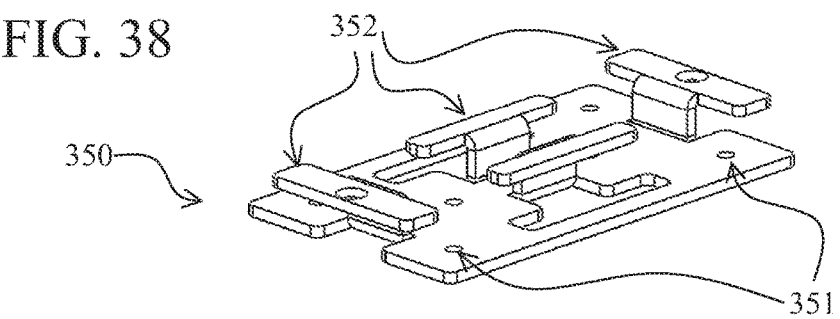
FIG. 38 is an isometric perspective view of a hanger bracket.
Figure 39:
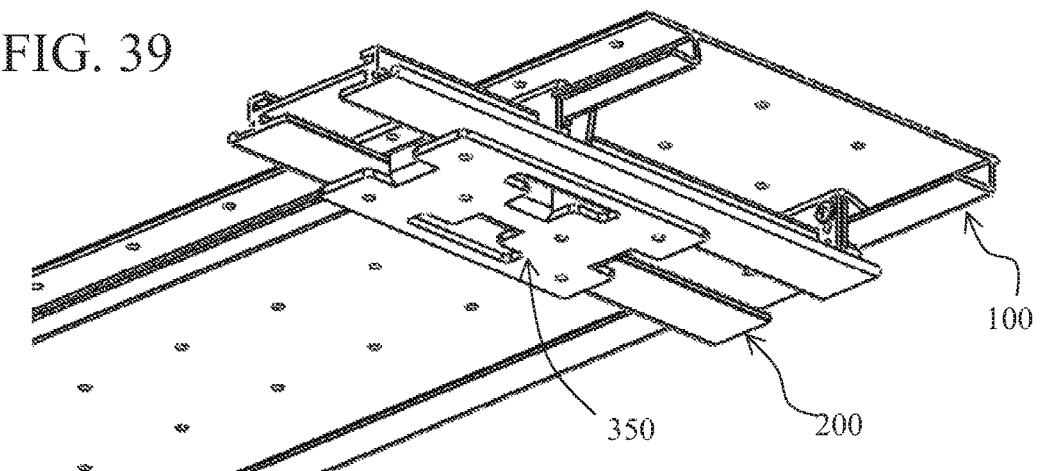
FIG. 39 is a schematic perspective view of the hanger bracket engaged with the lock-on carriage parallel to the lock-on carriage.
Figure 40:
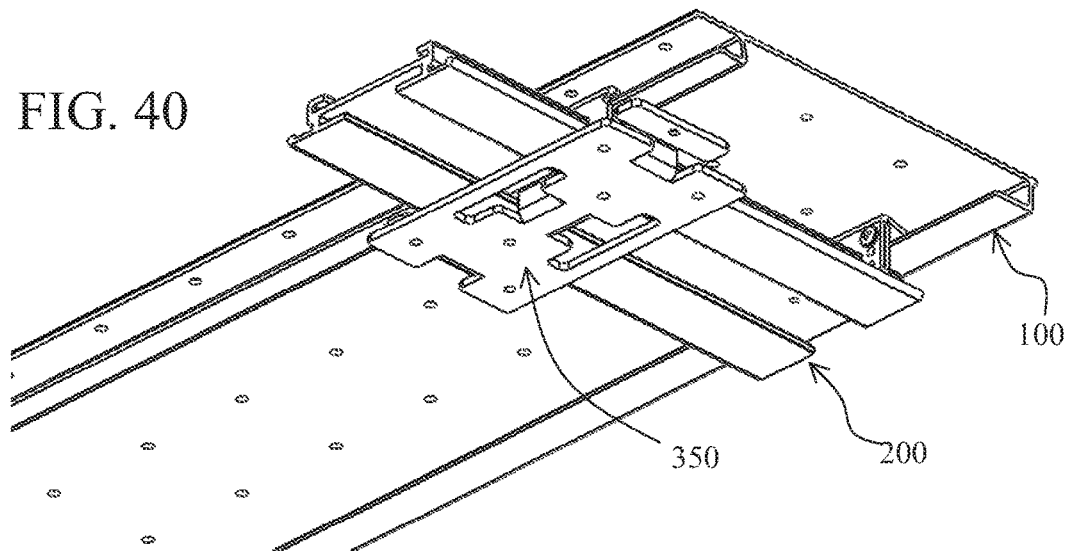
FIG. 40 is a schematic perspective view of the hanger bracket engaged with the lock-on carriage perpendicular to the lock-on carriage.

FIG. 38 shows a hanger bracket 350 that performs essentially the function of the anchor-post 300 but does not allow the payload to pivot. The hanger bracket 350 is a substantially flat plate with fastener holes 351 or other means of attaching a payload (such as a clock radio, toaster oven, paper towel holder, etc.) and raised flat tabs or flanges 352 dimensioned to engage the lower c-channel 252 of the carriage base extrusion 250 in both parallel FIG. 39 and perpendicular FIG. 40 positioning to the lock-on carriage 200. Note that this or a similar bracket, as well as the anchor post 300, can be used to slidingly engage items/articles with the carriage base extrusion 250 attached directly to a cabinet bottom or other surface.

Figure 41:
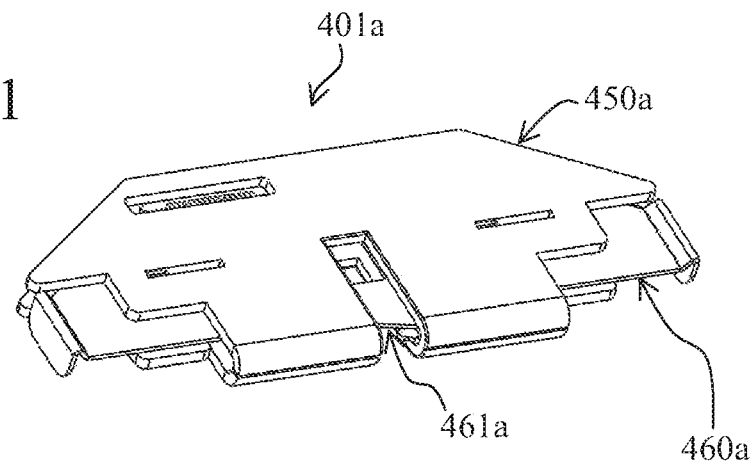
FIG. 41 is a schematic perspective view of an alternative embodiment of the connector shoe that uses a slidable locking plate.
Figure 42:
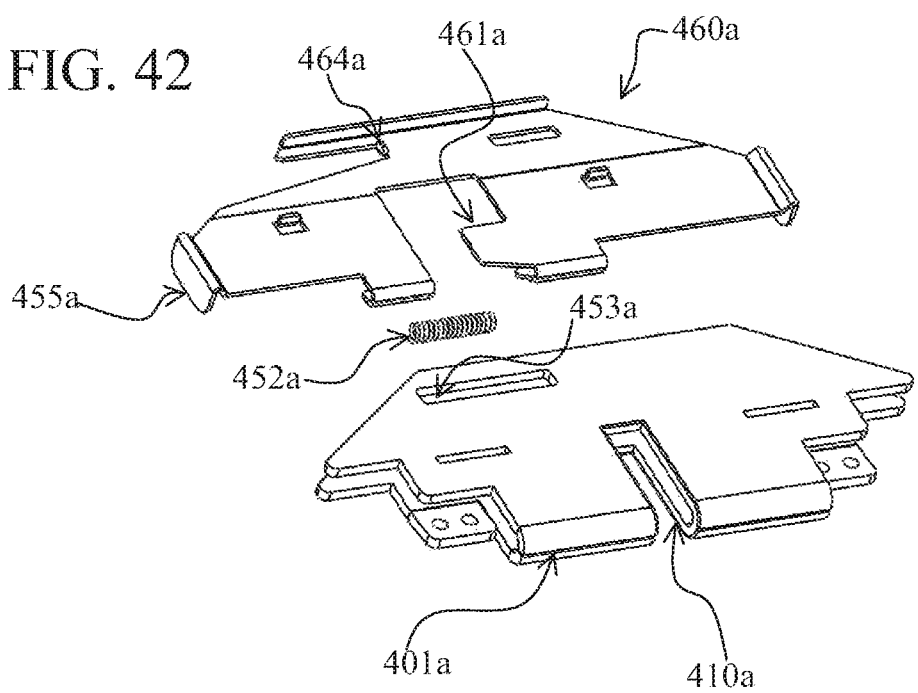
FIG. 42 is an exploded schematic perspective view of the connector shoe in FIG. 41.

FIGS. 41 & 42 show an alternative design for the slot connector shoe 401 (FIG. 13) that employs a spring-loaded locking plate 460a. The slide-locking slot connector shoe 401a includes an outer housing body 450a that slidingly houses a locking plate 460a. A tension spring 452a connected between points 464a and 453a pulls the locking plate 460a into the locked position where a blocking member 461a closes the back of the retaining slot 410a and prevents it from disengaging the anchor-post 300. To disengage the anchor-post 300 the user presses the lock plate thumb button 455a to advance the blocking member 461a so it clears the retaining slot 410a.

Figure 43:
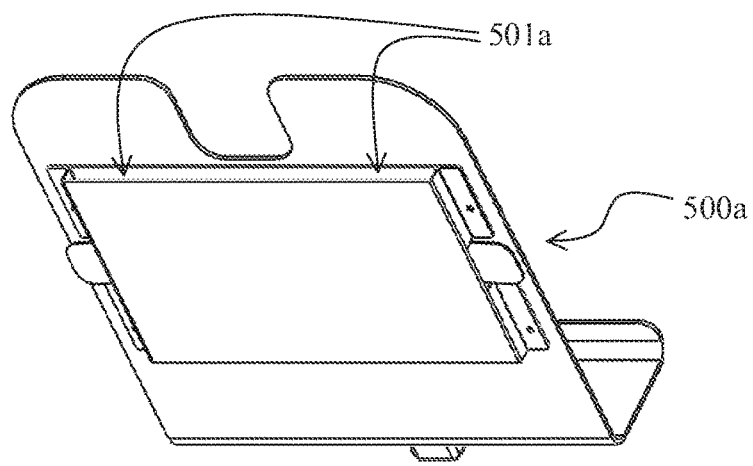
FIG. 43 is a schematic perspective view of an alternative embodiment of the payload carrier.
Figure 44:
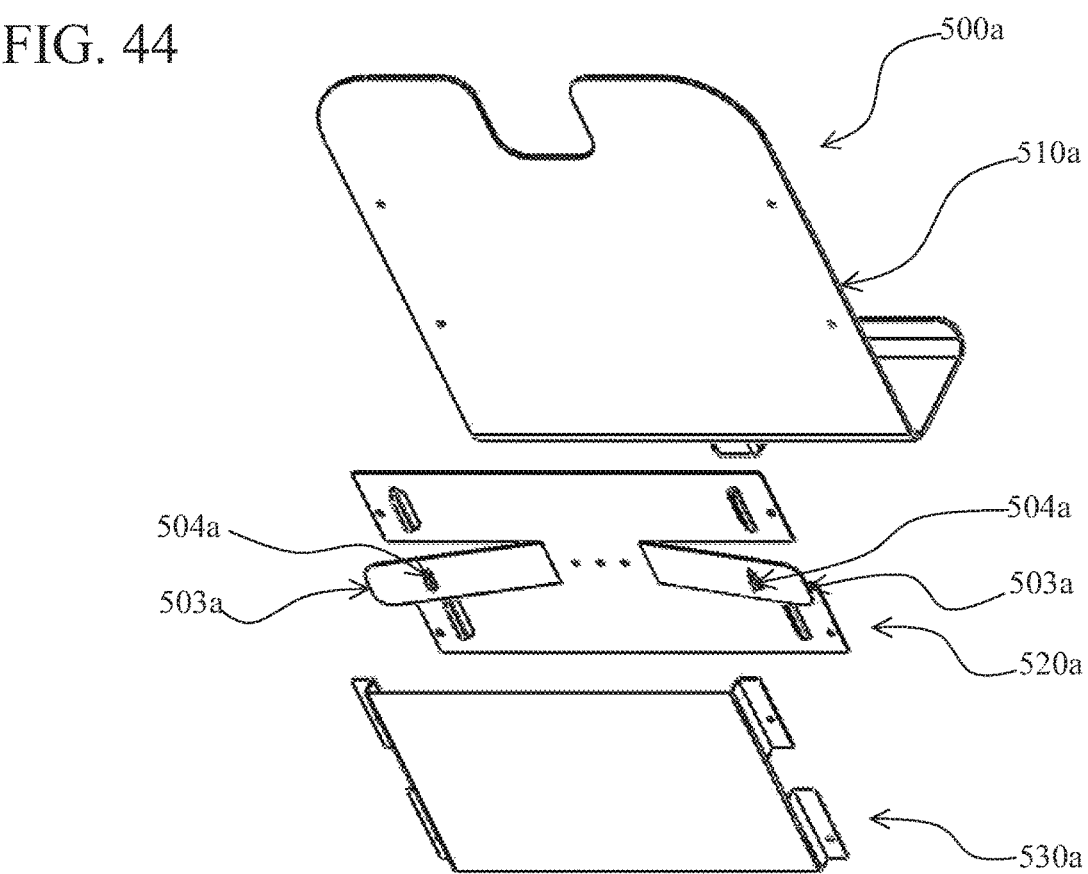
FIG. 44 is an exploded schematic perspective view of an alternative embodiment of the payload carrier in FIG. 43.

FIGS. 43 & 44 show an alternative embodiment 500a of the preferred embodiment payload carrier 500 (FIG. 24-28). This unit is made up of three components 1) an easel shell 510a, 2) a wing tab plate 520a and 3) a channel cover plate 530a that cooperatively engage the multi-surface easel L-frame 403. When assembled as in FIG. 43 the three components form a wide, flat channel 501a, which the multi-surface easel L-frame 403 (FIG. 15) can slidingly engage. Within this channel 501*a* the L-frame stop slots 404 will be engaged by the stop hook tabs 504*a* on the wing tab plate 520*a*. The user can depress the wing tabs 503*a* to allow the L-frame 403 to slide within the channel 501*a*. Note that 520*a* and 530*a* can be attached to any payload-type article (utility box, book easel, tablet easel, knife block) providing for reliable, adjustable, sliding attachment of the article to the long frame side of the multi-surface easel-stand 400.

CONCLUSION AND RAMIFICATIONS

Thus the reader will see that the system of the invention provides the user with a convenient means to mount, move, remove, and store articles under a downwardly facing surface such that the articles are inconspicuous under the downwardly-facing surface, and such that pull-down access to said articles can be gained easily by a user and can be adjusted for height, tilt and depth relative to the user and adjusted laterally along the entire, continuous facing edge of the downwardly-facing surface and whereby said access and orientation adjustments and said manipulations can be executed easily by hand and without the use of tools. The system of the invention also provides the user with a convenient means to mount, move, remove, and gain enhanced access to articles on a vertical surface or on a horizontal surface such that the articles can be adjusted for height and tilt relative to the user whereby said access and orientation adjustments and said manipulations can be executed easily by hand and without the use of tools. The system is also very easy to install requiring little or no planning, measuring, cutting, clamping or fitting.

While the above description contains many detailed specifics, these should not be construed as limitations on the invention but rather as an example of one preferred embodiment thereof. Many other variations are possible. For example the easel-stand could be used without the lock-on carriage and tram-rail by attaching the anchor-post directly to the cabinet bottom for cases where the user does not foresee the need to move the payload side-to-side or front-to-back on the cabinet bottom. Furthermore, the channel base extrusion can be attached directly to the cabinet bottom in cases where the user does not foresee the need to move the payload side-to-side on the cabinet bottom but would like the option of moving it front-to-back.

Also, the channel base extrusion's dimensions can be substantially varied to address use-specific issues. For example it can be thicker for greater strength (to resist greater downward shearing force) and wider for greater twisting stability. Also, the dimensions of the anchor-post can be substantially varied to address use-specific issues, for example its threaded post can be thicker for greater strength (to resist greater lateral shearing force) or its plate dimensions can be changed to fit different carriage base extrusions or to allow rotation within the carriage base extrusion's lower channel. Also, the hanger bracket is shown made from stamped/formed metal but can also be injection molded in plastic or extruded and/or machined in plastic or metal. Also practically anywhere the preferred embodiment calls for a planar member the member can be narrowed or made into latticed member to reduce weight and material use.

Accordingly the scope of the invention should be determined not by the embodiments illustrated, but by the appended legal claims and their legal equivalents.

What is claimed is:

1. A support apparatus comprising:
an L-shaped frame having a short side and a long side;
a payload carrier having slots and a knob; and
a connector pivotally coupled to said short side, wherein said connector selectively couples said short side to: an under-cabinet tram-rail unit with said payload carrier slots engaging said long side to support a payload; and said knob of said payload carrier with said long side resting on a horizontal surface.

2. The support apparatus of claim 1, further comprising a longitudinally extending tram-rail unit having a pair of parallel, spaced c-shaped channels extending along the length thereof, wherein both c-shaped channels extend down from one side of said tram-rail unit.

3. The support apparatus of claim 1, further comprising:
a carriage having a carriage base cut from an extrusion having an upwardly extending c-channel, wherein said carriage base selectively receiving within its c-channel one of
(i) a movable footing arrangement having a fixed back footing edge adapted to engage a back c-shaped channel on the tram rail unit, a stop plate and a front footing plate slidably disposed within said c-channel adapted to selectively clamp a front c-shaped channel on the tram rail unit against said stop plate to allow the carriage to slide along the tram rail unit; and
(ii) a fixed footing arrangement having a fixed back footing edge adapted to engage the back c-shaped channel on the tram rail unit, a flexible wing tab and a front footing edge adapted to engage the front c-shaped channel on the tram rail unit against the biasing force of said flexible wing tab to attach the carriage at a fixed location on the tram rail unit, and
an anchor post mounted on said carriage for engaging said slot of a connector shoe.

4. A support apparatus comprising:
a longitudinally extending tram-rail unit having a pair of parallel, spaced c-shaped channels extending along the length thereof, wherein both c-shaped channels extend down from one side of said tram-rail unit and face in a same direction; and
a carriage having two footings that are spaced and configured to engage the pair of parallel, spaced c-shaped channels to support the carriage at a selected location along the length of said tram-rail unit, said carriage further having a carriage base with an upwardly extending c-channel that can selectively receive: a movable footings arrangement that can slide along the upwardly extending c-channel; and a fixed footings arrangement that can attach to the upwardly extending c-channel at a fixed location.

5. A support apparatus comprising:
a carriage having a carriage base cut from an extrusion having an upwardly extending c-channel, wherein said carriage base selectively receiving within said c-channel one of
(i) a movable footing arrangement having a fixed back footing edge adapted to engage a back c-shaped channel on a tram rail unit, a stop plate and a front footing plate slidably disposed within said c-channel adapted to selectively clamp a front c-shaped channel on the tram rail unit against said stop plate to attach the carriage at a fixed location on the tram rail unit; and
(ii) a fixed footing arrangement having a fixed back footing edge adapted to engage the back c-shaped channel on a tram rail unit, a movable locking tab and a front footing edge adapted to engage the front c-shaped channel on the tram rail unit and held in place by said locking tab to attach the carriage at a fixed location on the tram rail unit.

6. The support apparatus according to claim 5, further comprising a longitudinally extending tram-rail unit having a pair of parallel, spaced c-shaped channels extending along the length thereof, wherein both c-shaped channels extend down from one side of said tram-rail unit.

7. The support apparatus according to claim 6, wherein said c-shaped channels of said tram rail unit face in a same direction and are spaced at a distance to insure torquing stability; wherein said tram rail unit is adapted to be mounted to a cabinet bottom.

8. The support apparatus according to claim 6, further including a resilient member dimensioned and positioned to maintain said fixed footing arrangement from moving horizontally along, or disengaging from, said c-shaped channels of said tram rail unit, wherein said resilient member is selected from a bendable member, a rotational member, and a sliding member.

9. The support apparatus according to claim 5, wherein said carriage base is a substantially flat elongated member having a top channel to receive tram rail engaging arrangements and a bottom channel to receive payload supports.

10. The support apparatus according to claim 9, wherein said movable footing arrangement includes one footing plate supporting said fixed back footing edge fixed within said top channel, and a second footing plate slidably disposed within said top channel, and wherein said fixed back footing edge is height adjustable to tilt said carriage to accommodate cabinet depth.

11. The support apparatus according to claim 5, further comprising a connector including a flat plate, a threaded bore adapted to slide along a track and a bolt correspondingly sized to engage the bore to frictionally engage the track to lock said flat plate in position.

12. The support apparatus according to claim 5, further comprising a substantially L-shaped frame having a short side and a long side being wide enough to insure payload stability, and in an undercabinet mode means to engage a lock-on carriage on to said short end thereof, and in a countertop mode means to engage a payload carrier on to said short end thereof, and in a vertical surface deployment mode means to engage a vertical surface at said short end thereof, and means to slidingly engage and disengage a payload on substantially an entire length of said long side of said L-shaped frame.

13. A support apparatus comprising:

a longitudinally extending tram-rail unit having a pair of parallel, spaced c-shaped channels extending along the length thereof, wherein both c-shaped channels extend down from one side of said tram-rail unit and face in a same direction; and a carriage having two footings that are spaced and configured to engage the pair of c-shaped channels to support the carriage at a selected location along the length of said tram-rail unit, wherein said carriage includes a carriage base with an upwardly extending c-channel that can selectively receive one of (i) a movable footings arrangement that can slide along the c-shaped channels in the longitudinal direction and (ii) a fixed footings arrangement that can attach to the c-shaped channels at a fixed location.

* * * * *